Oct. 31, 1967 C. R. BETZ 3,350,293
PASSIVATING SILICON SEMICONDUCTOR DEVICES WITH SPUTTERED TUNGSTEN OXIDE AT LOW TEMPERATURES
Original Filed Dec. 6, 1963
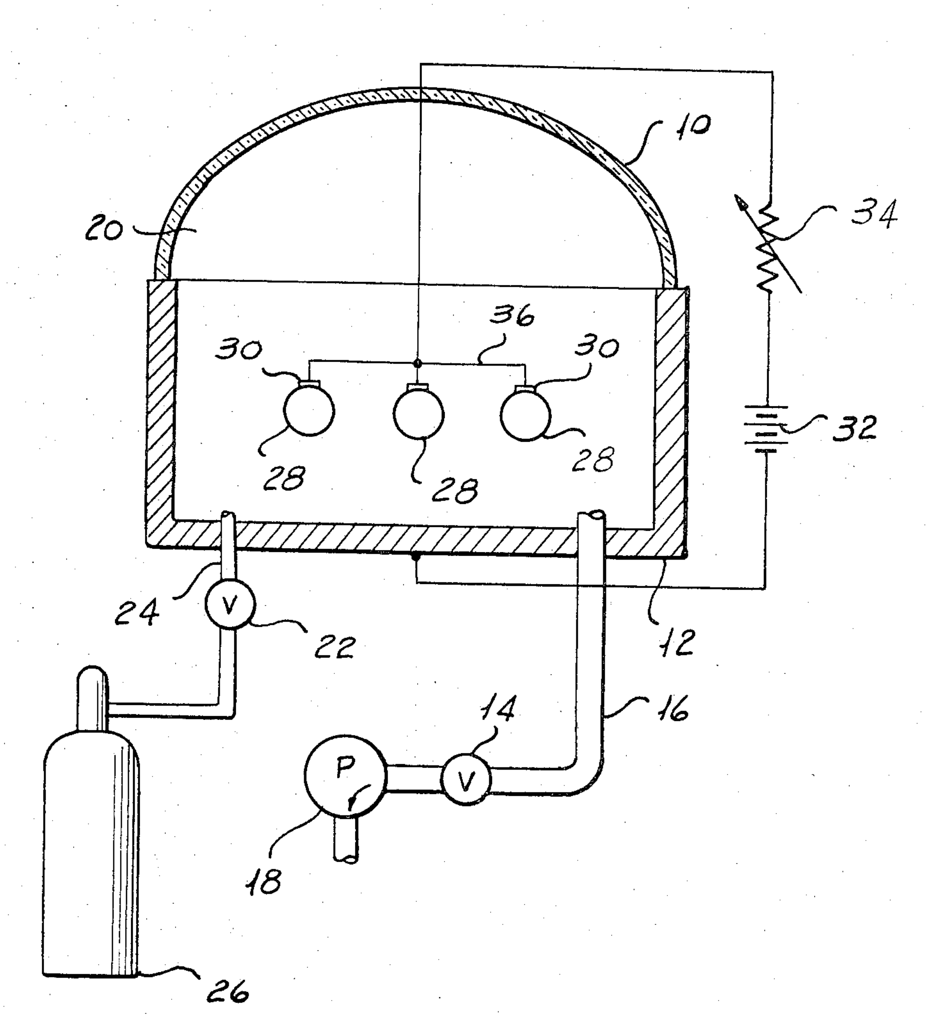
INVENTOR.
CARL R. BETZ
BY
Shenier & O'Connor
ATTORNEYS United States Patent Office 3,350,293
Patented Oct. 31, 1967

3,350,293
PASSIVATING SILICON SEMICONDUCTOR DEVICES WITH SPUTTERED TUNGSTEN OXIDE AT LOW TEMPERATURES

Carl R. Betz, Phoenix, Ariz., assignor, by mesne assignments, to Components, Inc., a corporation of Delaware
Continuation of application Ser. No. 328,742, Dec. 6, 1963. This application Nov. 14, 1966, Ser. No. 594,262
3 Claims. (Cl. 204—192)

ABSTRACT OF THE DISCLOSURE

This invention relates to a method of passivating the surface of a semiconductor device after contacts have been applied thereto in which the device is placed in a chamber in spaced relationship to a metallic cathode which is bombarded with ions of a non-noble gas to sputter a passivating coating of a compound of the non-noble gas and the cathode metal onto the surface of the semiconductor body.

This application is a continuation of my copending application Ser. No. 328,742, filed Dec. 6, 1963, now abandoned.

In the prior art semiconductor devices customarily are provided with stable oxide surface coatings which make the devices stable with time, cause them to have low leakage currents and enable them to withstand severe environmental conditions without deterioration. It is necessary to subject the devices to relatively high temperatures in the range of from about 900° C. to 1200° C. in methods of the prior art for producing passivating coatings. The metals such as nickel, aluminum, silver, gold and the like which are used to make contacts with semiconductors alloy with the semiconductor material such as silicon at the high temperatures required for passivating in the prior art. This alloying produces undesirable changes in the characteristics of the device.

Owing to the fact that alloying might take place between the contact and semiconductor materials at temperatures used for passivating in the prior art, semiconductor devices are manufactured without contacts until after the oxidation step has been completed. Following oxidation to produce the passivating coating, difficult and time-consuming masking and etching operations are required to permit contacts to be applied to the devcie. By use of these techniques, contacts can be applied over only relatively small areas. Moreover, where passivating techniques of the prior art are used, solder cannot be applied to the device before passivation since it would melt at the required temperature.

I have invented a method of passivating a semiconductor device which avoids the difficulties of techniques of the prior art discussed hereinabove. In my process I can passivate a device having leads attached thereto without deleteriously affecting its characteristics. My process is carried out at a temperature which is relatively low as compared with temperatures required for processes of the prior art. My methods does away with the difficult masking and etching operations which are necessary in the prior art to permit contacts to be applied to the device after passivation. My method permits semiconductor devices to be passivated immediately prior to encapsulation.

One object of my invention is to provide a method of passivating semiconductor devices which overcomes the defects of techniques of the prior art.

Another object of my invention is to provide a method of passivating semiconductor devices at a relatively low temperature as compared with the temperature at which this operation must be carried out in the prior art.

A further object of my invention is to provide a method of passivating a semiconductor device having leads attached thereto without affecting the characteristics of the device.

Yet another object of my invention is to provide a method of passivating semiconductor devices which reduces the number of steps required in the manufacture of a completed semiconductor device.

Other and further objects of my invention will appear from the following description.

In general my invention contemplates the provision of a method for passivating semiconductor devices at relatively low temperatures in which I bombard a readily oxidizable metal cathode with ions of a non-noble gas to sputter material onto the semiconductor devices which act as anodes. The ions of non-noble gas combine with the cathode material to form a tightly adherent passivating oxide coating on the surface of the semiconductor device.

In the accompanying drawing which forms part of the instant specification and which is to be read in conjunction therewith, the figure is a schematic view of one form of apparatus which can be employed to carry out my method of passivating semiconductor devices at low temperatures.

Referring now to the figure, one form of apparatus which can be employed to carry out my method of passivating semiconductor devices includes a housing 10 formed of a suitable insulating material such, for example, as glass supported on a cup-like base 12 of conductive material such as metal to form a chamber 20. A valve 14 connects a pipe 16 leading into the chamber 20 formed by the housing 10 and by the base 12 to a pump 18 adapted to evacuate the chamber 20. A second valve 22 connects a pipe 24 leading to chamber 20 to a bottle or tank 26 containing a supply of a suitable non-noble gas such, for example, as oxygen or nitrogen or the like.

In practicing my method, I first close valve 22 and open valve 14 and operate the pump 18 to produce a vacuum within the chamber 20. I have found that for best results it is desirable to create a vacuum of around $10^{-6}$ mm. of mercury. I maintain this vacuum for a time sufficient to out-gas substantially all of the components from the chamber 20. Approximately thirty minutes of operation of the pump 18 should be sufficient to produce the required vacuum.

When I have pumped out the chamber 20, I close valve 14 and open valve 22 to permit non-noble gas from the tank 26 to flow into chamber 20. The pressure of non-noble gas within the chamber 20 can be within the range of from about 1 to about $100\times10^{-3}$ mm. of mercury. Preferably, I employ a pressure of from about 20 to about $50\times10^{-3}$ mm. of mercury and I maintain this pressure during the course of operation of my process by leaving valve 22 open slightly to permit a small continuous flow of gas.

The articles such, for example, as semi-conductor devices 28, are placed within the chamber 20 on supports or the like 30. I connect a source of potential such as a battery 32 in series with a current determining resistor 34 between the conductor 36 connected to the supports 30 and the base 12. Battery 32 may provide a potential of 500 v., for example, depending upon the gas pressure. With this arrangement, it will readily be apparent that the base 12 functions as a cathode and the devices 28 act as anodes. With the potential 32 applied to the device, a plasma comprising positive ions of the non-noble gas which has been introduced into the chamber 20 forms within the chamber. I form the cathode 12 from a suitable material which is adapted to be sputtered in response to bombardment by the positive ions of the plasma. I have found that with this arrangement a thin passivating coating of an oxide of the cathode material forms on the surfaces of the articles 28. The temperature at which this takes place may be any temperature from room temperature to about 300° C.

The precise mechanism by which this oxide film forms is not entirely evident. It is most probable that when the positive ions bombard the surface of the target or cathode 12, the oxide is formed at the cathode. The impact of subsequent ions on the target surface sputters away the oxide film. This appears to be the most reasonable explanation for the phenomenon since oxide films have been formed on surfaces by bombarding them with oxygen ions. Moreover, at the time the ions arrive at the surface of the target 12, they have appreciable energy which is released at the instant of impact. Part of this energy is dissipated in the form of heat but it is believed that the ion energy abets the reaction in the formation of the oxide. The molecules of oxide released upon bombardment of subsequent ions have high thermal energies so that they travel to the articles 28 and impinge on the surfaces thereof with considerable energy and are bonded intimately to these surfaces. I have found that oxide films produced by this method are tightly adherent to the devices 28.

It is possible that other mechanisms than that described above might account for the formation of the oxide films. For example, it might be that metal ions sputtered from the surface would encounter oxygen ions and combine therewith to form the oxide. Owing to the reduced gas pressure in the chamber 20, however, this occurrence is less likely than is the mechanism described above. The least likely manner in which the phenomenon might take place is the formation of the oxide upon arrival of a metal atom at the surface of one of the devices 28. It may be that all three of these phenomena contribute to the formation of the oxide coating on the articles 28.

As a practical matter, I have discovered that, for example, where I use a tungsten cathode or target 12 and I use oxygen as the non-noble gas, I am able to build up a film of tungsten oxide of from several hundreds up to several thousands A. thick on the surface of a device 28 such as a silicon wafer or a silicon diode. This film completely passivates the device. I may, if desired, deposit doped coatings by use of my technique in connection with auxiliary cathodes as well as the main cathode 12. It will readily be appreciated that while I have shown a form of cathode 12 which is generally cup-shaped and in which the devices 28 are disposed, any other suitable configuration of the system can be employed.

In practice of my method of passivating devices, such as silicon wafers 28 or the like, I first place the devices to be passivated within the chamber 20 on the supports 30. When this has been done, I open valve 14 and operate pump 18 to produce the desired vacuum. I then open valve 22 to supply the non-noble gas, such as oxygen or nitrogen, being used into the chamber 20 until the required pressure is reached. I then substantially close valve 22 but leave it open to a degree sufficient to maintain the operating pressure within chamber 20. Next, I apply the potential of battery 32 between the cathode 12 which may, for example, be tungsten, and the devices 28 which act as anodes. Resistor 34 is set for the proper current value. After a period of time, a passivating coating of the oxide or nitride of the metal of cathode 12 forms on the surfaces of the devices 28.

The particular mechanism by which the coating forms on the devices 28 most likely is that the ions which bombard the surface of the cathode 12 form an oxide film thereon and subsequent ions sputter the oxide film onto the surfaces of the devices 28. Owing to the high thermal velocity of the particles of oxide arriving at the surfaces of the devices 28, they form a tightly adherent passivating coating thereon.

It will be seen that I have accomplished the objects of my invention. I have provided a method of passivating semiconductor devices at relatively low temperatures as compared with temperatures of the prior art for producing passivating coatings. My method permits passivation of devices having leads attached thereto without affecting the characteristics of the device.

My method reduces the number of steps required in the manufacture of a completed semiconductor device.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention what I claim is:

1. A method of passivating the surface of a silicon semiconductor device to which a metallic contact has been applied including the steps of placing said device in a chamber in spaced relationship to a tungsten cathode, introducing into said chamber a gas selected from the group consisting of oxygen and nitrogen, forming a plasma of ions of said gas within said chamber and bombarding said cathode with said ions to sputter a passivating coating of a tungsten compound of said gas on the surface of said device.

2. A method as in claim 1 including the step of applying to said device a potential higher than that of said cathode.

3. A method of passivating the surface of a semiconductor device having a body of silicon semiconductor material to which a metallic contact has been applied including the steps of placing said device in a chamber in spaced relation to a tungsten cathode, evacuating said chamber, supplying oxygen to said chamber and applying a potential between said device and said cathode to bombard said cathode with oxygen ions to sputter a passivating coating of tungsten oxide compound onto the surface of said body.

References Cited

UNITED STATES PATENTS

| | | | |
|---|---|---|---|
| 2,886,502 | 5/1959 | Holland | 204—192 |
| 2,928,162 | 3/1960 | Marinace | 29—25.3 |
| 2,972,092 | 2/1961 | Nelson | 317—235 |
| 3,021,271 | 2/1962 | Wehner | 204—192 |
| 3,093,507 | 6/1963 | Lander et al. | 117—201 |
| 3,235,476 | 2/1966 | Boyd et al. | 204—192 |

JOHN H. MACK, *Primary Examiner.*

ROBERT K. MIHALEK, *Examiner.*